(12) United States Patent
Gao et al.

(10) Patent No.: US 10,943,551 B2
(45) Date of Patent: Mar. 9, 2021

(54) DISPLAY SUBSTRATE CONTROLLING VOLTAGE APPLIED FROM COMMON ELECTRODE VOLTAGE INPUT LINE TO COMMON ELECTRODE, DISPLAY DEVICE AND METHOD FOR DRIVING THE SAME

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jilei Gao, Beijing (CN); Xuebing Jiang, Beijing (CN); Qingpu Wang, Beijing (CN); Jun Li, Beijing (CN); Mo Chen, Beijing (CN); Jian Zhao, Beijing (CN); Yang Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 210 days.

(21) Appl. No.: 15/779,522

(22) PCT Filed: Aug. 10, 2017

(86) PCT No.: PCT/CN2017/096712
§ 371 (c)(1),
(2) Date: May 27, 2018

(87) PCT Pub. No.: WO2018/126684
PCT Pub. Date: Jul. 12, 2018

(65) Prior Publication Data
US 2020/0175936 A1    Jun. 4, 2020

(30) Foreign Application Priority Data

Jan. 3, 2017    (CN) .......................... 201710001965.6

(51) Int. Cl.
*G02F 1/1362*     (2006.01)
*G09G 3/36*       (2006.01)
(Continued)

(52) U.S. Cl.
CPC ......... *G09G 3/3648* (2013.01); *G02F 1/1368* (2013.01); *G02F 1/13624* (2013.01);
(Continued)

(58) Field of Classification Search
CPC ...... G02F 1/1362; G02F 1/1368; G02F 1/133; G02F 1/13306; G02F 1/136286
See application file for complete search history.

(56) References Cited

U.S. PATENT DOCUMENTS 8,289,310 B2   10/2012   Lee et al.
9,460,670 B2   10/2016   Duan
(Continued)

FOREIGN PATENT DOCUMENTS

CN   101634786 A   1/2010
CN   101726893 A   6/2010
(Continued)

OTHER PUBLICATIONS

English translation of International Search Report and English translation of Box V of Written Opinion, for International Application No. PCT/CN2017/096712, dated Oct. 27, 2017, 13 pages.
(Continued)

*Primary Examiner* — Ram A Mistry
(74) *Attorney, Agent, or Firm* — Westman, Champlin & Koehler, P.A.

(57) ABSTRACT

A display substrate, a display device and a method for driving the same are provided. The display substrate
(Continued)

includes a plurality of sub-regions. At least one subpixel unit, a common electrode voltage input line, a common electrode voltage control line and at least one control TFT are arranged at each sub-region. At each sub-region, a gate electrode of the control TFT is coupled to the common electrode voltage control line, a source electrode of the control TFT is coupled to the common electrode voltage input line, and a drain electrode of the control TFT is coupled to a common electrode of the subpixel unit.

14 Claims, 7 Drawing Sheets

(51) Int. Cl.
  *G02F 1/1343* (2006.01)
  *G02F 1/1368* (2006.01)
(52) U.S. Cl.
  CPC ..... *G02F 1/134309* (2013.01); *G09G 3/3607* (2013.01); *G02F 2001/134345* (2013.01); *G02F 2201/121* (2013.01); *G09G 2300/0426* (2013.01); *G09G 2320/0233* (2013.01)

(56) References Cited

U.S. PATENT DOCUMENTS

| | | | |
|---|---|---|---|
| 9,659,541 | B2 | 5/2017 | Jin et al. |
| 10,180,612 | B2 | 1/2019 | Zhao et al. |
| 2008/0136804 | A1* | 6/2008 | Lee ............... G09G 3/3655 345/211 |
| 2008/0186304 | A1 | 8/2008 | You et al. |
| 2010/0103085 | A1 | 4/2010 | Lee et al. |
| 2012/0038585 | A1* | 2/2012 | Kim ............... G02F 1/13338 345/174 |
| 2014/0118657 | A1 | 5/2014 | Duan |
| 2016/0104442 | A1 | 4/2016 | Jin et al. |
| 2016/0335976 | A1 | 11/2016 | Chen et al. |
| 2017/0092211 | A1 | 3/2017 | Xu et al. |
| 2017/0299907 | A1 | 10/2017 | Zhao et al. |

FOREIGN PATENT DOCUMENTS

| | | | |
|---|---|---|---|
| CN | 102023423 | A | 4/2011 |
| CN | 102707525 | A | 10/2012 |
| CN | 103885261 | A | 6/2014 |
| CN | 104299593 | A | 1/2015 |
| CN | 104317121 | A | 1/2015 |
| CN | 105093599 | A | 11/2015 |
| CN | 105116659 | A | 12/2015 |
| CN | 105278194 | A | 1/2016 |
| CN | 105446035 | A | 3/2016 |
| CN | 105633093 | A | 6/2016 |
| CN | 106773412 | A | 5/2017 |
| KR | 10-2009-0013531 | A | 2/2009 |

OTHER PUBLICATIONS

First Office Action, including Search Report, for Chinese Patent Application No. 201710001965.6, dated Mar. 4, 2019, 16 pages.

* cited by examiner

DISPLAY SUBSTRATE CONTROLLING VOLTAGE APPLIED FROM COMMON ELECTRODE VOLTAGE INPUT LINE TO COMMON ELECTRODE, DISPLAY DEVICE AND METHOD FOR DRIVING THE SAME

CROSS-REFERENCE TO RELATED APPLICATION

The present application is the U.S. national phase of PCT Application PCT/CN2017/096712 filed on Aug. 10, 2017, which claims a priority of the Chinese patent application No.201710001965.6 filed on Jan. 3, 2017, which is incorporated herein by reference in its entirety.

TECHNICAL FIELD

The present disclosure relates to the field of display technology, and in particular to a display substrate, a display device and a method for driving the same.

BACKGROUND

Along with the improvement in the life quality, flat-panel display devices have become an indispensable part of life. Currently, as a mainstream product, a thin film transistor liquid crystal display (TFT-LCD) has such advantages as small volume, low power consumption, being free of radiation and low manufacture cost. Along with the development of the display industry and the improvement in the living standard, a display effect is highly demanded. In order to meet the requirement on the display effect, an internal design of a liquid crystal panel is highly demanded too.

In a TFT array substrate in the related art, due to such factors as design and process, voltage attenuation ($\Delta$VP) for pixel electrodes at different regions of the TFT array substrate may vary in the case that a gate electrode is turned off. At this time, in the case that an identical common voltage is applied, differences between pixel voltages and the common voltages at different regions may vary, resulting in different grayscale differences and thereby a non-uniform display effect.

SUMMARY

An object of the present disclosure is to provide a display substrate, a display device and a driving method, so as to solve the technical problem in the related art where the different voltage differences between the pixel voltages and the common voltages at different regions of the display panel result in different grayscale differences and a non-uniform display effect.

In one aspect, the present disclosure provides in some embodiments a display substrate including a plurality of sub-regions. At least one sub-region includes at least one subpixel unit, a common electrode voltage input line, a common electrode voltage control line and at least one control TFT are arranged at. A gate electrode of the control TFT is coupled to the common electrode voltage control line, a source electrode of the control TFT is coupled to the common electrode voltage input line, and a drain electrode of the control TFT is coupled to a common electrode of the subpixel unit.

Optionally, the at least one sub-region each includes at least one row of subpixel units.

Optionally, the common electrodes of the row of subpixel units at the sub-region are spaced apart from each other, and each subpixel unit corresponds to one control TFT.

Optionally, the display substrate further includes a gate line, and the common electrode voltage input line and the common electrode voltage control line are arranged parallel to the gate line, and created from a same layer and made of a same material with the gate line.

Optionally, the common electrode voltage input line and the common electrode voltage control line coupled to the subpixel units in an identical row are arranged at an identical side of the row of subpixel units, and the gate line is arranged at an opposite side of the row of subpixel units.

Optionally, each control TFT is created from a layer identical to a gate electrode of a switch TFT of each subpixel unit, an active layer of the control TFT is created from a layer identical to an active layer of the switch TFT, and the source electrode and the drain electrode of the control TFT are created from a layer identical to a source electrode and a drain electrode of the switch TFT.

Optionally, the switch TFT of each of the subpixel units in an odd-numbered row is coupled to a data line at a first side of the corresponding subpixel unit, the source electrode of the switch TFT of each of the subpixel units in an odd-numbered row is arranged adjacent to the data line coupled to the switch TFT, and the drain electrode of the switch TFT is arranged away from the data line coupled to the switch TFT. The switch TFT of each of the subpixel units in an even-numbered row is coupled to a data line at a second side of the corresponding subpixel unit, the source electrode of the switch TFT of each of the subpixel units in an even-numbered row is arranged adjacent to the data line coupled to the switch TFT, and the drain electrode of the switch TFT is arranged away from the data line coupled to the switch TFT. The first side is a left side and the second side is a right side, or the first side is a right side and the second side is a left side.

Optionally, the at least one sub-region each includes a plurality of rows of subpixel units.

Optionally, the common electrodes of the subpixel units at the sub-region are coupled to each other.

In another aspect, the present disclosure provides in some embodiments a display device including the above-mentioned display substrate and a control module. The control module is coupled to the common electrode voltage control lines and the common electrode voltage input lines, to apply a control voltage to the common electrode voltage control lines at different sub-regions and apply a common voltage to the common electrode voltage input lines at different sub-regions, and to provide an identical voltage difference between the common voltage applied to each common electrode and a voltage applied to each pixel electrode at different sub-regions.

Optionally, the control module is further configured to apply an identical common voltage to the common electrode voltage input lines at different sub-regions.

Optionally, the sub-regions each includes at least one row of subpixel units. The control voltage applied by the control module to each common electrode voltage control line at each sub-region corresponding to the subpixel units in an odd-numbered row is different from the control voltage applied by the control module to each common electrode voltage control line at each sub-region corresponding to the subpixel units in an even-numbered row, to provide an identical voltage difference between the common voltage applied to each common electrode and the voltage applied to each pixel electrode at different sub-regions.

Optionally, the common electrode voltage control lines of the sub-pixel units in the odd-numbered rows are coupled to each other and then to the control module, and the common electrode voltage control lines of the sub-pixel units in the even-numbered rows are coupled to each other and then to the control module.

Optionally, each of the common electrode voltage control lines of the subpixel units in the odd-numbered rows is coupled to the control module, and each of the common electrode voltage control lines of the subpixel units in the even-numbered rows is coupled to the control module.

In yet another aspect, the present disclosure provides in some embodiments a method for driving the above-mentioned display device, including: applying a control voltage to each of the common electrode voltage control lines at different sub-regions and applying a common voltage to each of the common electrode voltage input lines at different sub-regions, to provide an identical voltage difference between the common voltage applied to each common electrode and a voltage applied to each pixel electrode at different sub-regions.

Optionally, the applying the control voltage to each of the common electrode voltage control lines at different sub-regions and applying the common voltage to each of the common electrode voltage input lines at different sub-regions includes applying an identical common voltage to the common electrode voltage input lines at different sub-regions.

Optionally, the sub-regions each includes at least one row of subpixel units. The applying the control voltage to each of the common electrode voltage control lines at different sub-regions and applying the common voltage to each of the common electrode voltage input lines at different sub-regions includes applying the control voltage to each of the common electrode voltage control lines at the sub-regions corresponding to the subpixel units in odd-numbered rows, and applying the different control voltage to each of the common electrode voltage control lines at the sub-regions corresponding to the subpixel units in even-numbered rows, to provide an identical voltage difference between the common voltage applied to each common electrode and the voltage applied to each pixel electrode at different sub-regions.

According to the embodiments of the present disclosure, the display substrate includes the plurality of sub-regions, the common electrodes are each sub-region are coupled to the common electrode voltage input line through the control TFT, and the common voltage is applied from the common electrode voltage input line to the common electrode merely through the control TFT. As a result, it is able to provide an identical voltage difference between the pixel voltage and the common voltage at each sub-region, thereby to provide an identical grayscale difference and ensure a uniform display effect.

DETAILED DESCRIPTION OF THE EMBODIMENTS

Figure 1:
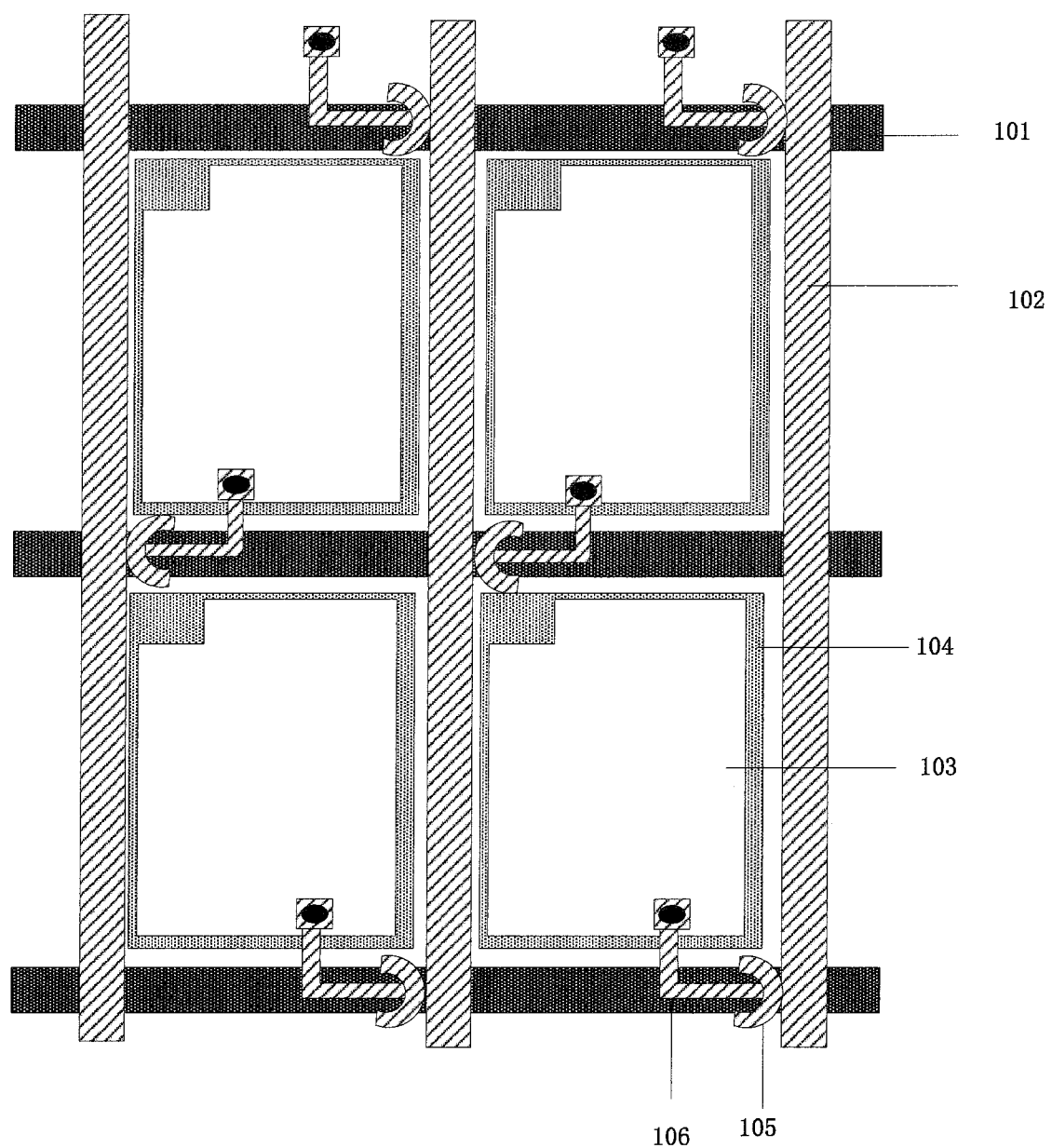
FIG. 1 is a schematic view showing an array substrate designed in a Z-inversion direction in the related art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In order to solve the problem in the related art where different voltage differences between the pixel voltages and the common voltages at different regions of the display panel result in different grayscale differences and a non-uniform display effect, the present disclosure provides in some embodiments a display substrate including a plurality of sub-regions. At least one subpixel unit, a common electrode voltage input line, a common electrode voltage control line and at least one control TFT are arranged at each sub-region. At each sub-region, a gate electrode of the control TFT is coupled to the common electrode voltage control line, a source electrode of the control TFT is coupled to the common electrode voltage input line, and a drain electrode of the control TFT is coupled to a common electrode of the subpixel unit.

The gate electrode of the control TFT is equivalent to a switch, and different voltages may be applied to the gate electrode of the control TFT, so as to control an on-state degree of the control TFT, i.e., control a size of a current between the source electrode and the drain electrode of the control TFT.

In some embodiments of the present disclosure, the voltage may be applied from the common electrode voltage input line to the common electrode through the control TFT. Based on an operating principle of the control TFT, through controlling a size of the control voltage applied to the common electrode voltage control line, it is able to control a current between the source electrode and the drain electrode of the control TFT coupled to the common electrode voltage control line, thereby to control a size of the voltage applied from the common electrode voltage input line to the common electrode. As a result, it is able to provide an identical voltage difference between a pixel voltage and the common electrode at each sub-region, thereby to provide an identical grayscale difference and a uniform display effect.

Optionally, the display substrate may be an array substrate, or a color filter substrate. In the following, the array substrate is taken as an example.

Currently, a large number of array substrates are designed in a Z-inversion direction, i.e., a switch TFT corresponding to each subpixel unit in an odd-numbered row is opened in a direction opposite to a switch TFT corresponding to each subpixel unit in an even-numbered row. The so-called "direction" refers to a direction from a source electrode to a drain electrode of the switch TFT. Referring to FIG. 1, which is a schematic view showing an array substrate in the related art designed in the Z-inversion direction, the array substrate includes gate lines 101, data lines 102 and subpixel units each arranged at a pixel region defined by the adjacent gate lines 101 and the adjacent data lines 102. Each subpixel unit includes a pixel electrode 103 and a common electrode 104, and corresponds to one switch TFT. A gate electrode of each TFT is coupled to the corresponding gate line 101 (in a possible embodiment of the present disclosure, the gate electrode is a part of the corresponding gate line 101), a source electrode 105 thereof is coupled to the corresponding data line 102, and a drain electrode 106 thereof is coupled to the pixel electrode 103. As shown in FIG. 1, the switch TFT of each of the subpixel units in a first row and a third row (odd-numbered rows) is coupled to the data line at a right side of the corresponding sub-pixel unit, the source electrode of each of the switch TFTs of the subpixel units in the first row and the third row is arranged adjacent to the data line coupled to the switch TFT, and the drain electrode of the control TFT is arranged away from the data line coupled to the switch TFT. The switch TFT of each of the subpixel units in a second row (even-numbered row) is coupled to the data line at a left side of the corresponding subpixel unit, the source electrode of the switch TFT of each of the subpixels in the second row is arranged adjacent to the data line coupled to the switch TFT, and the drain electrode of the control TFT is arranged away from the data line coupled to the switch TFT. In this way, the switch TFT of each of the subpixel units in the odd-numbered rows is opened in a direction opposite to the switch TFT of each of the subpixel units in the even-numbered rows.

In the case that the switch TFT of each of the subpixel units in the odd-numbered rows is opened in a direction different from the switch TFT of each of the subpixel units in the even-numbered rows and there is a fluctuation in the manufacture accuracy, an overlapping area between the gate electrode and the source electrode of the switch TFT corresponding to each of the subpixel units in the odd-numbered rows is necessarily different from an overlapping area between the gate electrode and the source electrode of the switch TFT corresponding to each of the subpixel units in the even-numbered rows. Based on the current manufacture accuracy, the overlapping areas are different from each other by about 5%. As a result, a gate-to-source capacitance (Cgs) of the switch TFT corresponding to each of the subpixels in the odd-numbered rows is different to a Cgs of the switch TFT corresponding to each of the subpixels in the even-numbered rows.

Figure 2:
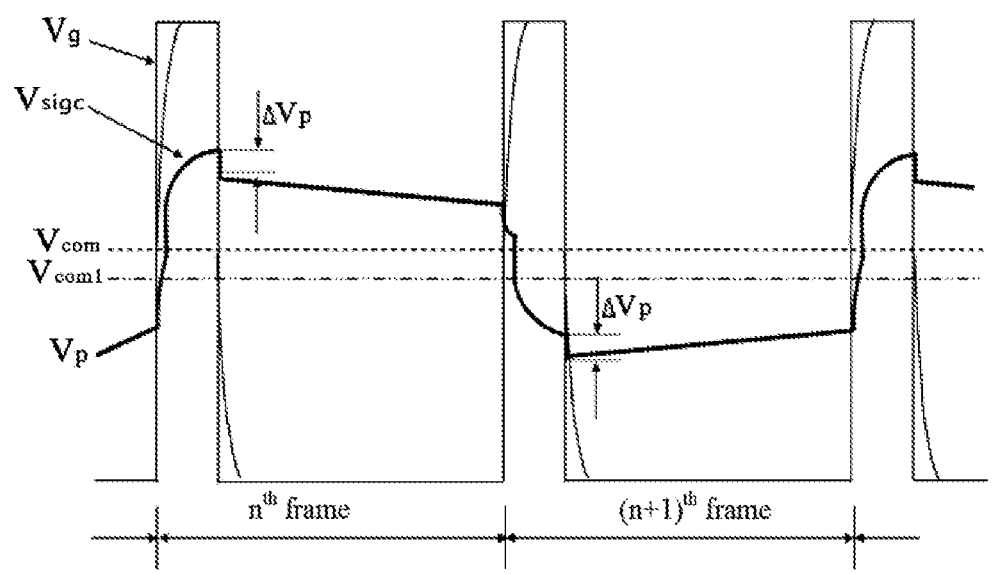
FIG. 2 is a schematic view showing an attenuation situation of a voltage applied to a pixel electrode of the array substrate in the related art in the case that a gate electrode is turned off.

Voltage attenuation ΔVP may occur for the pixel electrode in the case that its gate electrode is turned off. As shown in FIG. 2, Vg represents a gate voltage Vgate, Vp represents a pixel voltage Vpixel, Vsig.c represents a data voltage applied to the data line, and Vcom represents a normal data voltage. In the case that ΔVP is not taken into consideration, an ideal common voltage may be acquired. Vcom1 represents a common voltage in the case that ΔVP is taken into consideration. In FIG. 2, ΔVP occurs within each subframe.

In addition, ΔVP may be calculated through the following equation:

$$\Delta Vp = \frac{C_{gs}}{C_{gs} + C_{lc} + C_{st}} \Delta Vg,$$

where ΔVP represents the voltage attenuation occurring for the pixel electrode in the case that the gate electrode is turned off, Cgs represents the gate-to-source capacitance, Clc represents a liquid crystal capacitance, Cst represents a storage capacitance, and ΔVg represents a difference between VGH (an on-state voltage of the gate electrode) and VGL (an off-state voltage of the gate electrode).

Based on the above equation, in the case that the Cgs of the switch TFT corresponding to each of the subpixel units in the odd-numbered rows is different from the Cgs of the switch TFT corresponding to each of the subpixel units in the even-numbered rows, ΔVP occurring for each of the subpixel units in the odd-numbered rows may be different from ΔVP occurring for each of the subpixel units in the even-numbered rows. In the case that an identical common voltage is applied to the subpixel units in the odd-numbered rows and the even-numbered rows, the differences between the common voltages applied to the common electrodes and the pixel voltages applied to the pixel electrodes may be different from each other, resulting in different grayscale differences and a display defect of alternately bright and data stripes.

Figure 3:
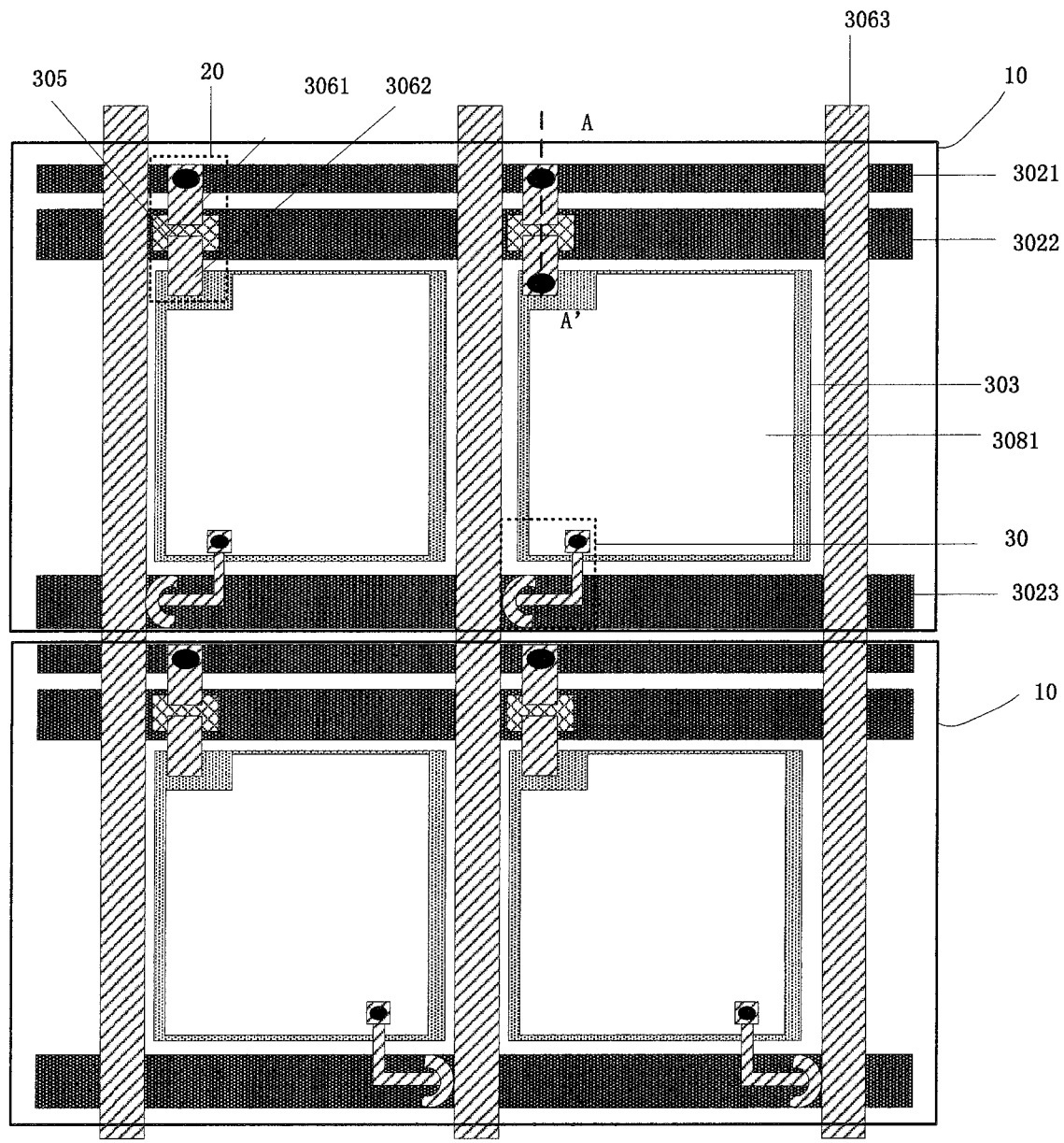
FIG. 3 is a schematic view showing a display substrate in some embodiments of the present disclosure.

In order to solve the above technical issue, the present disclosure further provides in some embodiments an array substrate. As shown in FIG. 3, the array substrate includes a plurality of sub-regions 10. A row of subpixel units, a common electrode voltage input line 3021, a common electrode voltage control line 3022 and a plurality of control TFTs 20 are arranged at each sub-region 10. Each subpixel unit includes a common electrode 303 and a pixel electrode 3081. At each sub-region 10, a gate electrode of each control TFT 20 is coupled to the common electrode voltage control line 3022 (the gate electrode of the control TFT 20 may be a part of the common electrode voltage control line 3022), a source electrode 3061 thereof is coupled to the common electrode voltage input line 3021, and a drain electrode 3062 thereof is coupled to the common electrode 303 of the subpixel unit.

In at least one embodiment of the present disclosure, the common electrodes 303 of the row of subpixel units in each sub-region may be spaced apart from each other, and each subpixel unit corresponds to one control TFT 20. In this way, the common voltage may be applied quickly from the common electrode voltage input line made of a metallic material to the common electrode of each subpixel unit. Of course, the common electrodes of the subpixel units in an identical row may also be coupled to each other, and then coupled to the common electrode voltage control line 3022 and the common electrode voltage input line 3021 through the corresponding control TFT, thereby reducing the number of the control TFTs.

The array substrate may further include gate lines 3023, data lines 3063 and switch TFTs 30 each corresponding to one subpixel unit. The common electrode voltage input line 3021 and the common electrode voltage control line 3022 may be arranged parallel to, and created from a layer identical to, the gate lines 3023, and they may be formed through a single patterning process without any addition masking procedure, thereby reducing the manufacture cost.

In at least one embodiment of the present disclosure, the common electrode voltage input line 3021 and the common electrode voltage control line 3022 coupled to the subpixel units in an identical row are arranged at an identical side of the row of subpixel units, and the gate line 3023 is arranged at an opposite side of the row of subpixel units, thereby improving the layout of the array substrate.

Figure 4:
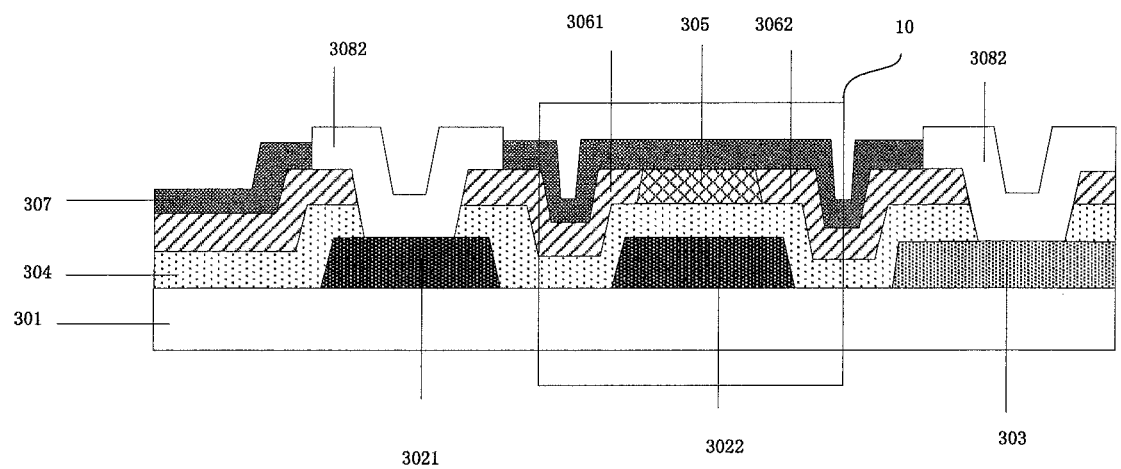
FIG. 4 is a sectional view of the display substrate along line A-A' in FIG. 3.

FIG. 4 is a sectional view of the array substrate along line A-A' in FIG. 3.

The array substrate will be described hereinafter in conjunction with FIG. 4. The array substrate may include: a base substrate 301; a gate metal layer, including the common electrode voltage input line 3021, the common electrode voltage control line 3022, the gate line 3023, a gate electrode of the control TFT 10 (the gate electrode may be a part of the common electrode voltage control line 3022), and a gate electrode (not shown) of the switch TFT, where the common electrode voltage input line 3021, the common electrode voltage control line 3022, the gate line 3023, the gate electrode of the control TFT 10 and the gate electrode of the switch TFT are formed through a single patterning process; a common electrode 303 arranged at a layer identical to the gate metal layer, where the common electrode 303 is usually made of indium tin oxide (ITO); a gate insulation layer 304; an active layer 305; a source-drain metal layer, including the data line 3063, a source electrode 3061 and a drain electrode 3062 of the control TFT 10, and a source electrode and a drain electrode (not shown) of the switch TFT, where the data line 3063, the source electrode 3061 and the drain electrode 3062 of the control TFT 10 and the source electrode and the drain electrode of the switch TFT are formed through a single patterning process; a passivation layer 307; and a pixel electrode layer, including the pixel electrode 3081, and a via-hole connection section 3082 arranged in a via-hoe penetrating through the passivation layer 307, the source-drain metal layer and the gate insulation layer 304 and configured to connect the source electrode 3061 of the control TFT 10 to the common electrode voltage input line 3021 and connect the drain electrode 3062 of the control TFT 10 to the common electrode 303, the pixel electrode layer is usually made of ITO.

In at least one embodiment of the present disclosure, the control TFT 20 and the switch TFT 30 of each subpixel unit are formed simultaneously, i.e., the gate electrode of the control TFT 20 is created from a layer identical to the gate electrode of the switch TFT 30, the gate insulation layer of the control TFT 20 is created from a layer identical to the gate insulation layer of the switch TFT 30, the active layer of the control TFT 20 is created from a layer identical to the active layer of the switch TFT 30, and the source and drain electrodes of the control TFT 20 are created from a layer identical to the source and drain electrodes of the switch TFT 30. In this way, it is able to form the control TFT without any additional masking procedure, thereby to reduce the manufacture cost.

As shown in FIG. 4, the common voltage must be applied from the common electrode voltage input line 3021 to the common electrode 303 through the control TFT 10. Based on the operating principle of the control TFT 10, through controlling a size of the voltage applied to the common electrode voltage control line 3022, it is able to control a size of the current between the source electrode 3061 and the drain electrode 3062 of the control TFT 10 coupled to the common electrode voltage control line 3022, thereby to control a size of the voltage applied from the common electrode voltage input line 3021 to the common electrode 303.

Figure 5:
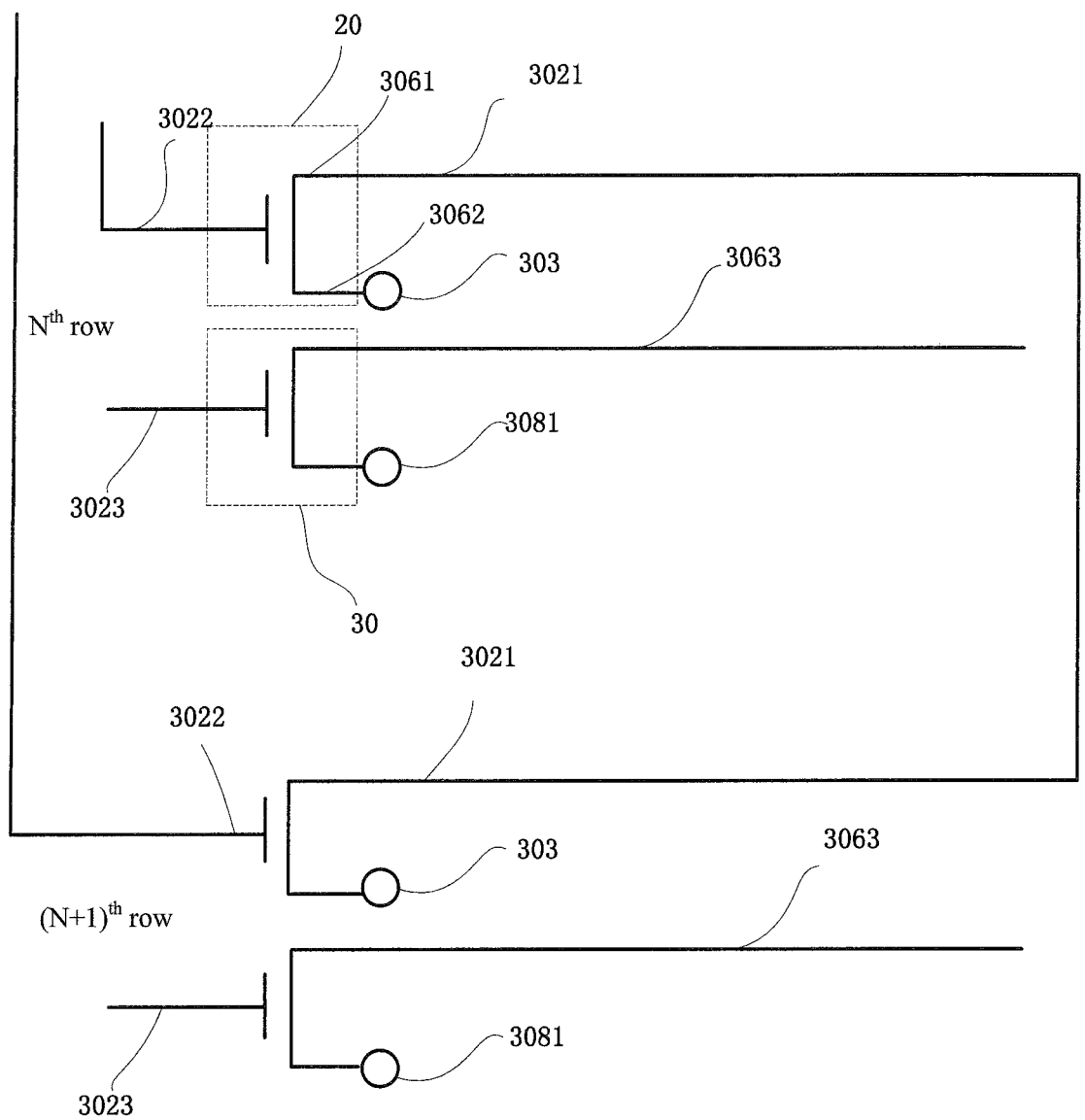
FIG. 5 is an equivalent circuit diagram of the display substrate in FIG. 3.

FIG. 5 is an equivalent circuit diagram of the array substrate in FIG. 3, and it shows a data voltage (Data) control circuit and a common electrode voltage (Vcom) control circuit corresponding to the subpixels in an $N^{th}$ row and an $(N+1)^{th}$ row.

In at least one embodiment of the present disclosure, the array substrate includes the plurality of sub-regions. One row of subpixel units are arranged at each sub-region, so as to enable the common electrode of each of the subpixel units in the odd-numbered rows to be spaced apart from the common electrode of each of the subpixel units in the even-numbered rows, thereby to control the common electrodes separately. In accordance with the practical need, different voltages, or an identical voltage, may be applied to the common electrode voltage input lines corresponding to the subpixel units in the odd-numbered rows and the even-numbered rows, and different voltages may be applied to the common electrode voltage control lines corresponding to the subpixel units in the odd-numbered rows and the even-nnumbered rows, so as to apply an identical common voltage to the common electrodes corresponding to the subpixel units in the odd-numbered rows and the even-numbered rows. As a result, as compared with the related art, it is able to provide an identical voltage difference between the pixel voltages and the common voltages for the subpixel units in the odd-numbered rows and the even-numbered rows, provide an identical grayscale difference and prevent the occurrence of alternately bright and dark stripes, thereby to achieve a uniform display effect and improve the display quality.

In at least one embodiment of the present disclosure, a direction from the source electrode to the drain electrode of the switch TFT of each of the subpixel units in the odd-numbered rows is opposite to a direction from the source electrode to the drain electrode of the switch TFT of each of the subpixel units in the even-numbered rows. Through this structure, different voltage differences may easily occur between the pixel voltages and the common voltages of the subpixel units in the odd-numbered and even-numbered rows.

Figure 6:
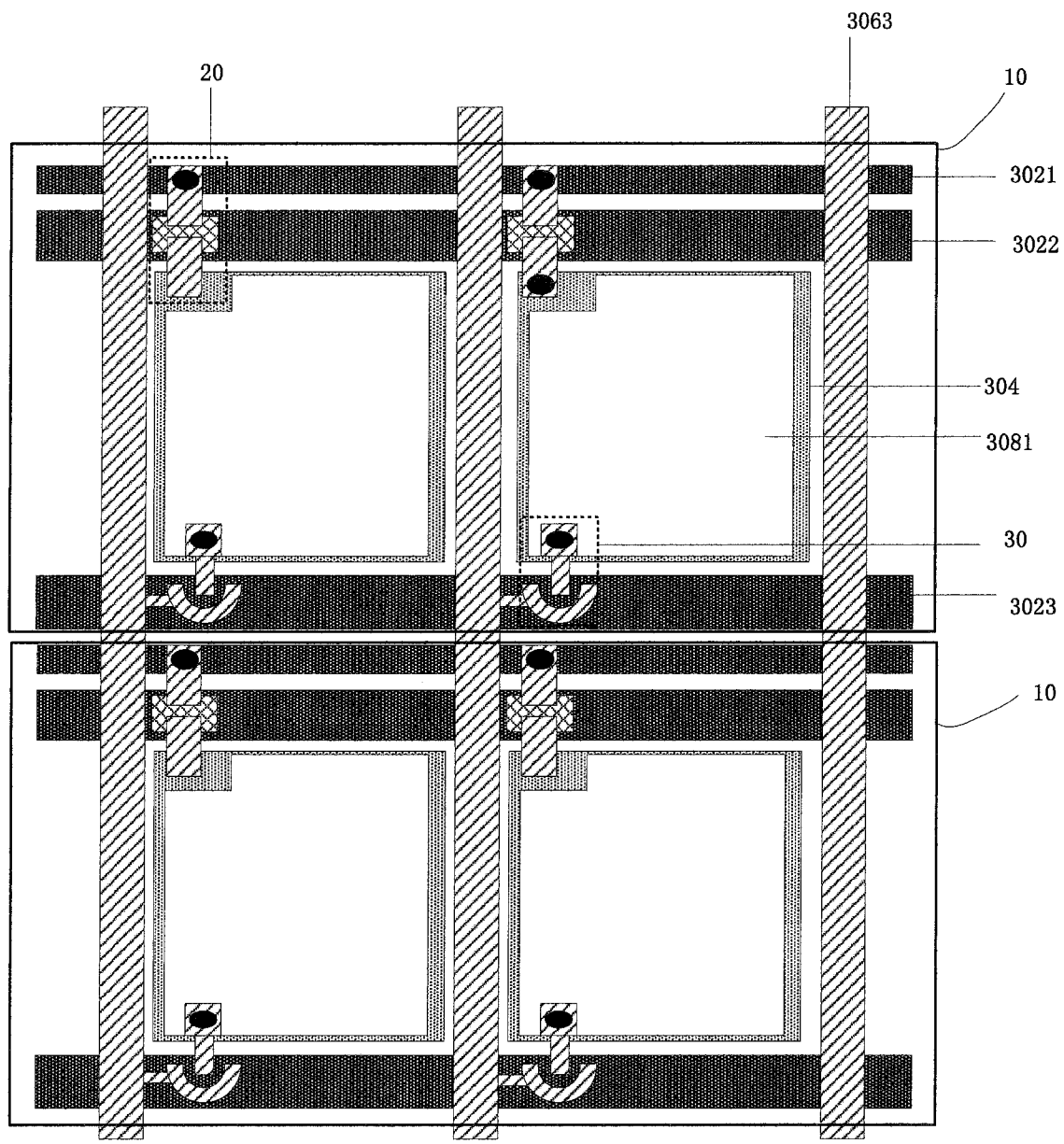
FIG. 6 is a schematic view showing an array substrate in some embodiments of the present disclosure.

Of course, the direction from the source electrode to the drain electrode of the switch TFT of each of the subpixel units in the odd-numbered rows may also be identical to the direction from the source electrode to the drain electrode of the switch TFT of each of the subpixel units in the even-numbered rows, as shown in FIG. 6. FIG. 6 differs from FIG. 3 merely in that the direction from the source electrode to the drain electrode of the switch TFT of each of the subpixel units in the odd-numbered rows is identical to the direction from the source electrode to the drain electrode of the switch TFT of each of the subpixel units in the even-numbered rows.

Figure 7:
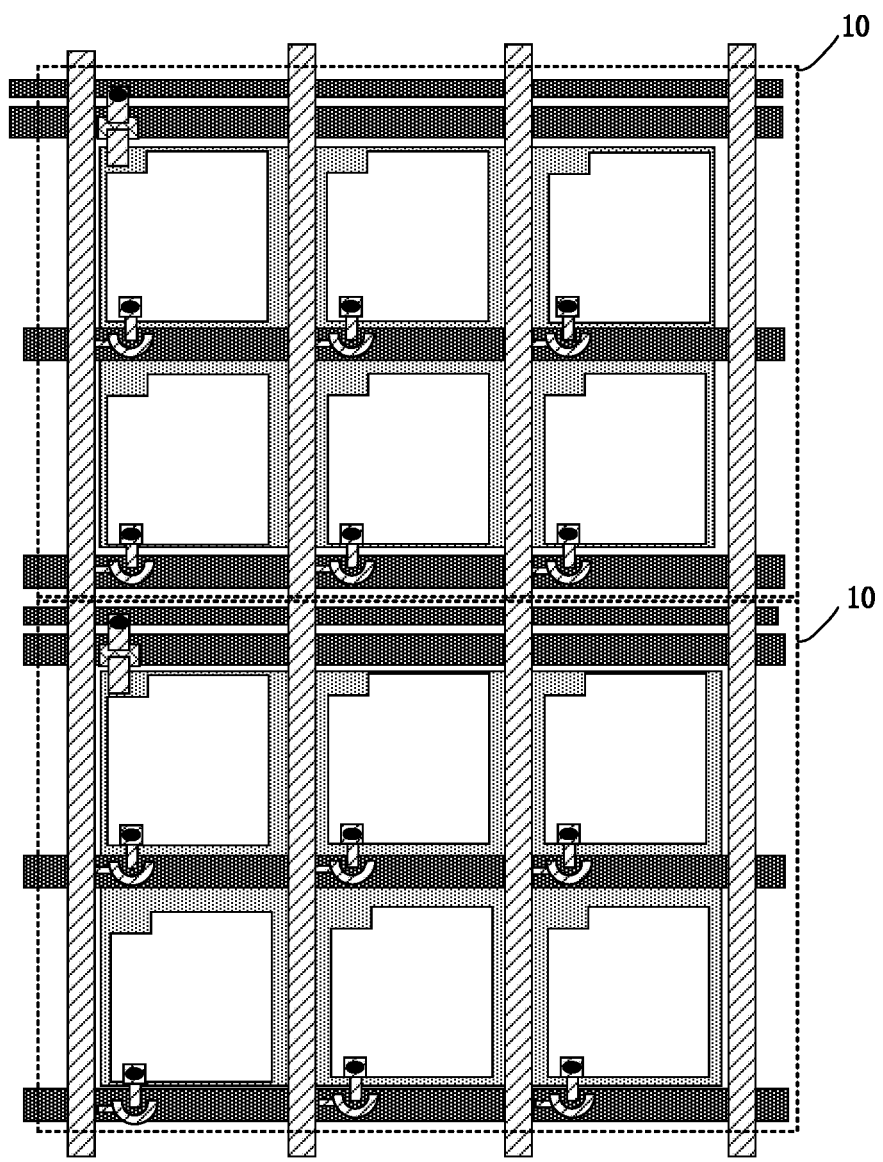
FIG. 7 is a schematic view showing an array substrate in some embodiments of the present disclosure.

In at least one embodiment of the present disclosure, one row of subpixel units are arranged at each sub-region 10. Of course, in some other embodiments of the present disclosure, a plurality of rows of subpixel units may also be arranged at each sub-region 10. As shown in FIG. 7, two rows of subpixel units are arranged at each sub-region 10, and the common electrodes of the subpixel units in each sub-region are coupled to each other. Optionally, at each sub-region 10, the common voltage may be applied to the common electrodes of the subpixel units in two rows merely through one common electrode voltage input line, one common electrode voltage control line and one control TFT.

As a result, it is able to reduce the number of the common electrode voltage input lines, the common electrode voltage control lines and the control TFTs, and meanwhile increase an aperture ratio of the array substrate.

Of course, the number of the rows of subpixel units at each sub-region will not be particularly defined herein.

In at least one embodiment of the present disclosure, the common electrode voltage input line and the common electrode voltage control line may be arranged parallel to, and created from a layer identical to, the gate line. Of course, the common electrode voltage input line and the common electrode voltage control line may be arranged in any other modes. For example, the common electrode voltage input line may be created from a layer identical to the data line, with a portion of the common electrode voltage input line bridging over the data line at a junction.

In at least one embodiment of the present disclosure, the array substrate is of an Advanced Switching (ADS), a High-aperture-ratio ADS (HADS), or an In-Plane Switching (IPS) mode.

The present disclosure further provides in some embodiments a display device, including the above-mentioned display substrate and a control module. The control module is coupled to the common electrode voltage control lines and the common electrode voltage input lines, so as to apply a control voltage to the common electrode voltage control lines at different sub-regions and apply a common voltage to the common electrode voltage input lines at different sub-regions, thereby to provide an identical voltage difference between the common voltage applied to each common electrode and a voltage applied to each pixel electrode at different sub-regions.

Optionally, the control module is further configured to apply an identical common voltage to the common electrode voltage input lines at different sub-regions. In this way, it is merely necessary to control a size of the voltage applied to the common electrode voltage control lines at the sub-regions without modifying the common voltage, thereby to control a size of the common voltage applied to the common electrodes at different sub-regions flexibly.

Optionally, a row of subpixel units are arranged at each sub-region, i.e., the common electrodes of the subpixel units in the odd-numbered rows and the even-numbered rows may be control separately. The control voltage applied by the control module to each common electrode voltage control line at each sub-region corresponding to the subpixel units in an odd-numbered row is different from the control voltage applied by the control module to each common electrode voltage control line at each sub-region corresponding to the subpixel units in an even-numbered row, so as to provide an identical voltage difference between the common voltage applied to each common electrode and the voltage applied to each pixel electrode at different sub-regions.

In at least one embodiment of the present disclosure, the common electrode voltage control lines of the sub-pixel units in the odd-numbered rows are coupled to each other and then to the control module, and the common electrode voltage control lines of the sub-pixel units in the even-numbered rows are coupled to each other and then to the control module. Of course, each of the common electrode voltage control lines of the subpixel units in the odd-numbered rows may be coupled to the control module, and each of the common electrode voltage control lines of the subpixel units in the even-numbered rows may be coupled to the control module.

The present disclosure further provides in some embodiments a method for driving the above-mentioned display device, which includes a step of applying a control voltage to each of the common electrode voltage control lines at different sub-regions and applying a common voltage to each of the common electrode voltage input lines at different sub-regions, so as to provide an identical voltage difference between the common voltage applied to each common electrode and a voltage applied to each pixel electrode at different sub-regions.

Optionally, the step of applying the control voltage to each of the common electrode voltage control lines at different sub-regions and applying the common voltage to each of the common electrode voltage input lines at different sub-regions includes applying an identical common voltage to the common electrode voltage input lines at different sub-regions.

Optionally, a row of subpixel units are arranged at each sub-region. The step of applying the control voltage to each of the common electrode voltage control lines at different sub-regions and applying the common voltage to each of the common electrode voltage input lines at different sub-regions includes applying the control voltage to each of the common electrode voltage control lines at the sub-regions corresponding to the subpixel units in odd-numbered rows, and applying the different control voltage to each of the common electrode voltage control lines at the sub-regions corresponding to the subpixel units in even-numbered rows.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a plurality of sub-regions, wherein at least one sub-region comprises at least one subpixel unit, a common electrode voltage input line, a common electrode voltage control line and at least one control Thin Film Transistor (TFT); anda gate electrode of the control TFT is coupled to the common electrode voltage control line, a source electrode of the control TFT is coupled to the common electrode voltage input line, and a drain electrode of the control TFT is coupled to a common electrode of the subpixel unit, the display substrate further comprises a gate line and a data line, wherein the common electrode voltage input line and the common electrode voltage control line are arranged parallel to the gate line, and created from a same layer and made of a same material with the gate line, the common electrode voltage input line and the common electrode voltage control line coupled to the subpixel units in an identical row are arranged at an identical side of the row of subpixel units, and the gate line is arranged at an opposite side of the row of subpixel units, each subpixel unit corresponds to a distinct control TFT and one switch TFT, a gate electrode of the switch TFT is coupled to the gate line, a source electrode of the switch TFT is coupled to the data line, and a drain electrode of the switch TFT is coupled to a pixel electrode.

2. The display substrate according to claim 1, wherein the at least one sub-region each comprises at least one row of subpixel units.

3. The display substrate according to claim 2, wherein the common electrodes of the row of subpixel units at the sub-region are spaced apart from each other, and each subpixel unit corresponds to one control TFT.

4. The display substrate according to claim 2, wherein the at least one sub-region each comprises a plurality of rows of subpixel units.

5. The display substrate according to claim 4, wherein the common electrodes of the subpixel units at the sub-region are coupled to each other.

6. The display substrate according to claim 1, wherein each control TFT is created from a layer identical to the gate electrode of the switch TFT of each subpixel unit, an active layer of the control TFT is created from a layer identical to an active layer of the switch TFT, and the source electrode and the drain electrode of the control TFT are created from a layer identical to the source electrode and the drain electrode of the switch TFT.

7. A display device, comprising the display substrate according to claim 1 and a control module, wherein the control module is coupled to the common electrode voltage control lines and the common electrode voltage input lines, to apply a control voltage to the common electrode voltage control lines at different sub-regions and apply a common voltage to the common electrode voltage input lines at different sub-regions, and to provide an identical voltage difference between the common voltage applied to each common electrode and a voltage applied to each pixel electrode at different sub-regions.

8. The display device according to claim 7, wherein the control module is further configured to apply an identical common voltage to the common electrode voltage input lines at different sub-regions.

9. The display device according to claim 8, wherein the sub-regions each comprises at least one row of subpixel units; and
the control voltage applied by the control module to each common electrode voltage control line at each sub-region corresponding to the subpixel units in an odd-numbered row is different from the control voltage applied by the control module to each common electrode voltage control line at each sub-region corresponding to the subpixel units in an even-numbered row, to provide an identical voltage difference between the common voltage applied to each common electrode and the voltage applied to each pixel electrode at different sub-regions.

10. The display device according to claim 7, wherein the common electrode voltage control lines of the sub-pixel units in the odd-numbered rows are coupled to each other and then to the control module, and the common electrode voltage control lines of the sub-pixel units in the even-numbered rows are coupled to each other and then to the control module.

11. The display device according to claim 7, wherein each of the common electrode voltage control lines of the sub-pixel units in the odd-numbered rows is coupled to the control module, and each of the common electrode voltage control lines of the subpixel units in the even-numbered rows is coupled to the control module.

12. A method for driving the display device according to claim 7, comprising:
applying a control voltage to each of the common electrode voltage control lines at different sub-regions and applying a common voltage to each of the common electrode voltage input lines at different sub-regions, to provide an identical voltage difference between the common voltage applied to each common electrode and a voltage applied to each pixel electrode at different sub-regions.

13. The method according to claim 12, wherein the applying the control voltage to each of the common electrode voltage control lines at different sub-regions and applying the common voltage to each of the common electrode voltage input lines at different sub-regions comprises: applying an identical common voltage to the common electrode voltage input lines at different sub-regions.

14. The method according to claim 13, wherein the sub-regions each comprises at least one row of subpixel units,
wherein the applying the control voltage to each of the common electrode voltage control lines at different sub-regions and applying the common voltage to each of the common electrode voltage input lines at different sub-regions comprises: applying the control voltage to each of the common electrode voltage control lines at the sub-regions corresponding to the subpixel units in odd-numbered rows, and applying the different control voltage to each of the common electrode voltage control lines at the sub-regions corresponding to the subpixel units in even-numbered rows, to provide an identical voltage difference between the common voltage applied to each common electrode and the voltage applied to each pixel electrode at different sub-regions.

* * * * *